United States Patent
Munkelt et al.

(10) Patent No.: US 8,791,997 B2
(45) Date of Patent: Jul. 29, 2014

(54) DEVICE AND METHOD FOR NON-CONTACT RECORDING OF SPATIAL COORDINATES OF A SURFACE

(75) Inventors: Christoph Munkelt, Jena (DE); Ingo Schmidt, Jena (DE); Peter Kuehmstedt, Jena (DE); Gunther Notni, Jena (DE)

(73) Assignees: Fraunhofer-Gesellschaft zur Foerderung der Angewandten Forschung E.V., Munich (DE); Friedrich-Schiller-Universitaet Jena, Jena (DE)

( * ) Notice: Subject to any disclaimer, the term of this patent is extended or adjusted under 35 U.S.C. 154(b) by 944 days.

(21) Appl. No.: 12/598,461

(22) PCT Filed: May 5, 2008

(86) PCT No.: PCT/EP2008/003740
§ 371 (c)(1),
(2), (4) Date: Jan. 26, 2010

(87) PCT Pub. No.: WO2008/135294
PCT Pub. Date: Nov. 13, 2008

(65) Prior Publication Data
US 2010/0141740 A1   Jun. 10, 2010

(30) Foreign Application Priority Data
May 4, 2007   (DE) .......................... 10 2007 022 361

(51) Int. Cl.
*H04N 7/18* (2006.01)
*G01B 11/25* (2006.01)
*G01B 11/245* (2006.01)

(52) U.S. Cl.
CPC ........ *G01B 11/2509* (2013.01); *G01B 11/2545* (2013.01); *G01B 11/245* (2013.01)
USPC ........................................................ 348/135

(58) Field of Classification Search
USPC ...................................................... 348/47, 135
See application file for complete search history.

(56) References Cited

U.S. PATENT DOCUMENTS

| | | | | |
|---|---|---|---|---|
| RE35,816 E | * | 6/1998 | Schulz | 356/608 |
| 6,268,923 B1 | * | 7/2001 | Michniewicz et al. | 356/512 |
| 6,930,704 B1 | | 8/2005 | Hamada | |
| 7,078,720 B2 | * | 7/2006 | Yamaguchi | 250/559.38 |
| 7,103,212 B2 | * | 9/2006 | Hager et al. | 382/154 |
| 7,336,375 B1 | * | 2/2008 | Faul et al. | 356/604 |

(Continued)

FOREIGN PATENT DOCUMENTS

| | | |
|---|---|---|
| DE | 102 19 054 | 11/2003 |
| GB | 2 328 280 | 2/1999 |
| WO | 97 / 05449 | 2/1997 |

*Primary Examiner* — Tung Vo
*Assistant Examiner* — Rowina Cattungal
(74) *Attorney, Agent, or Firm* — Fay Kaplun & Marcin, LLP

(57) ABSTRACT

A device and a method for non-contact recording of spatial coordinates of a surface includes a sensor head and a controller connected to the sensor head. The sensor head is designed as a portable hand-held device, a projector and two cameras. The controller is also designed as a portable device, with an electrochemical energy source housed in the controller or in the sensor head for power supply to the sensor head and the controller and no cable connection of the sensor head or the controller is provided to further stationary components of the device.

24 Claims, 2 Drawing Sheets

(56) References Cited

U.S. PATENT DOCUMENTS

| | | | |
|---|---|---|---|
| 7,860,301 B2 * | 12/2010 | Se et al. | 382/154 |
| 7,912,673 B2 * | 3/2011 | Hebert et al. | 702/153 |
| 8,031,909 B2 * | 10/2011 | Se et al. | 382/106 |
| 8,031,933 B2 * | 10/2011 | Se et al. | 382/154 |
| 8,095,705 B2 * | 1/2012 | Ogasawara | 710/38 |
| 2007/0097381 A1 | 5/2007 | Tobiason et al. | |

* cited by examiner

DEVICE AND METHOD FOR NON-CONTACT RECORDING OF SPATIAL COORDINATES OF A SURFACE

FIELD OF INVENTION

The present invention relates to a device for non-contact recording of spatial coordinates of a surface, in particular for measuring static objects which are difficult to access, and also to a corresponding method for non-contact recording of spatial surface coordinates.

BACKGROUND INFORMATION

It is known per se to record spatial coordinates of surfaces without contact in that stripe patterns are projected on the respective surface with at least one projector and the surface is thereby recorded with at least one camera, depth information being obtained by triangulation of object points which are identified with the help of the stripe patterns. A method of this type is disclosed for example in the publication DE 102 19 054 A1.

Conventional stripe projection-based 3D sensors are generally stored statically during the measuring data recording. A stand or a manual or automatic positioning unit is thereby used for a sensor which is used or the object. Transmission of data and also current supply of the sensor is thereby achieved in the state of the art via a cable connection to a fixed current and/or data network.

3D scanners according to the state of the art have the disadvantage that the freedom of movement of the sensor is restricted by the cable connection which is required in particular for the current supply. As a result, it is impossible to move about without restriction with the sensor around an object to be measured.

SUMMARY OF INVENTION

The present invention relates to a device for non-contact recording of spatial coordinates of a surface, which, in comparison thereto, can be used more flexibly. This device should make it possible, on the basis of a comparably rapid structured illumination, to measure dense 3D measuring point clouds in a completely illuminated field at the same time and hence rapidly. Furthermore, the present invention relates to a corresponding flexibly usable method for non-contact recording of spatial coordinates of a surface.

Flexible usability of the proposed device which comprises a sensor head and a control unit connected to the sensor head is produced in that the sensor head is designed as a portable hand-held device and comprises a projector with an imaging element and a projection lens for projecting a variable pattern, which can be generated on the imaging element, towards the surface and also at least one camera for observing the surface, the control unit likewise being designed as a portable device and comprising means for actuating the imaging element, for triggering recording by the at least one camera and for processing image data produced by the at least one camera, an electrochemical energy store for an energy supply of the sensor head and of the control unit being accommodated furthermore in the control unit or in the sensor head and no cable connection of the sensor head or of the control unit to further, stationary components of the device being provided. As a result, it is achieved in particular that, even when recording the surface of an object from various sides, in particular during an all-round measurement, no cable tree impedes the freedom of movement of a person implementing the measurement or interferes with the image during a measurement. The proposed device is therefore mains-independent and is hence suitable particularly well for manual guidance of the sensor head by a person who can also carry the control unit on his person.

A corresponding method which can be implemented with a device of this type and in which the control unit can be carried by a person guiding the sensor head comprises advantageously the following steps:

projecting various stripe patterns onto the surface and recording the surface illuminated with the stripe patterns by means of the projector and the at least one camera of the hand-guided sensor head, identifying mutually corresponding image points in image planes of the two cameras or mutually corresponding points in the image plane of the camera and on the imaging element by means of the patterns projected thereon and determining depth information for object points by triangulation on the basis of the thus identified image points or points corresponding to the respective object points.

Image points of two cameras may thereby be termed mutually corresponding if the same object point is imaged on them. One point in the image plane of a camera and one point on the imaging element may be termed mutually corresponding if the projection lens images the point on the imaging element onto the object point which is imaged by the camera onto the point in the image plane of the camera.

Typically, the sensor head of the device will comprise two cameras for observing the surface from two different directions. Then object points on the surface can be triangulated on the basis of the mutually corresponding image points of the two cameras in order to determine spatial coordinates of the surface. The subsequent description relates generally to this embodiment of the invention. However, the triangulation can just as well be effected on the basis of mutually corresponding points in the image plane of a camera and on the imaging element. It then suffices if the sensor head comprises only one camera. The subsequently described embodiments of the device can therefore be modified respectively in that one of the cameras is in this respect replaced by the projector.

Typical embodiments of the invention provide that a cable connection is provided between the sensor head and the control unit, said cable connection comprising current supply lines, lines for actuating the imaging element, a line connection for transmitting camera signals from the cameras to the control unit and for transmitting control signals from the control unit to the cameras and also signal lines for transmitting a trigger signal to the control unit. The cameras are thereby configured typically as digital cameras. Since the control unit is likewise configured as a portable device and can be carried by the person implementing the measurement on his person, this cable connection is not a hindrance.

In order to actuate the imaging element, the control unit can be connected for example via a digital visual interface (DVI) or a VGA connection to the sensor head and there to the imaging element.

The cameras of the sensor head can be connected for example via a FireWire interface or a USB interface to the control unit. Interfaces of this type are suitable for transmitting image data from cameras equipped with camera chips. The sensor head can also possibly be equipped with more than two cameras for measuring the surface, for example in order to avoid any ambiguities.

Preferred embodiments of the invention provide that, in addition to the sensor head and control unit, a base unit which is separated spatially from the sensor head and the control unit is provided, means for a wireless data exchange between the base unit and the control unit or the sensor head being provided. Complex calculation steps which are required for implementing a corresponding measuring method can consequently be implemented in the base unit which itself need not be portable and therefore also need not in particular be mains-independent. The base unit can concern for example a PC.

The mentioned means for wireless data exchange can comprise in particular a channel for transport of data obtained from camera images of the two cameras. These data can be obtained by pre-processing and/or partial evaluation already in the control unit from image data of the two cameras. As a result, a reduced quantity of data relative to transmitted data can be achieved without wires. The pre-processed or partially evaluated data can concern for example data which represent phase images or measuring images, a complex evaluation of these data being able then to take place in the base unit. At the same time, as a result of the pre-processing in the control unit, a requirement advantageously is dispensed with for wireless transmission of image data in real time. An outstandingly more rapid data communication is therefore necessary only between the sensor head and the control unit, where this is possible without difficulty because of the cable connection. As a result, recording sequences can also be implemented manually and mains-independently with a plurality of stripe patterns in a very short time, which would not be possible with a conventional wireless data transmission of for example analogue transmitting cameras. However, possibly complete image data sets can also be transmitted without wires to the base unit for example in order to produce status images.

For example a conventional WLAN connection is suitable as means for wireless data exchange between the control unit and the base unit, in particular for transmitting image data or data obtained from image data.

An advantageous method which can be implemented with a corresponding device having means for wireless data exchange between the control unit and the base unit provides that a trigger command is transmitted from the sensor head which can have a trigger for this purpose to the control unit in order to record an image sequence and the imaging element is actuated by the control unit in order to form a sequence of stripe patterns and control signals are given to the cameras in order to trigger respectively one recording sequence which is synchronised with the stripe patterns, image data thus obtained being transmitted from the cameras to the control device where the image data are pre-processed in order to form data reproducing phase images, and the data reproducing phase images being transmitted by the control unit without wires to the base station, this base station implementing further calculation steps for identifying mutually corresponding image points and for triangulating the object points.

There may thereby be termed phase image an assignment of a value (phase) which characterises a stripe pattern. Preferably, a recording sequence should thereby last at most 150 ms in order that a precise measurement is possible without shaking during manual guidance of the sensor head. Algorithms can thereby be used which enable identification of mutually corresponding image points and possibly also self-calibration with 8 to 10 stripe patterns per recording sequence, i.e. with 8 to 10 recordings per camera and recording sequence. In order to permit a sufficiently rapid measurement for a manual operation, the device should in any case allow an image repeat rate of at least 60 Hz.

An advantageous embodiment of the method provides that various parts of the surface, which mutually overlap in places, are recorded from various sensor head positions. In particular all-round measurements of surfaces of objects are possible and can be implemented due to the portability of the sensor head and the control unit in a particularly simple manner.

The device can, in preferred embodiments of the invention, comprise in addition at least one stationary linking camera connected to the base unit, which camera can be mounted securely for example on a stand, the means for wireless data exchange then comprising a channel for transport of control signals in order to synchronise triggering of the two cameras of the sensor head and of the linking camera. This channel can be produced for example by an RF connection which in turn can comprise a sensor, which is accommodated in the sensor head or in the control unit, and a receiver which is placed in the base unit or in or on the linking camera.

The linking camera makes it possible to undertake calibration of the various positions of the sensor head, it sufficing for this purpose if the linking camera makes recordings of the surface to be measured which are synchronised with the recording sequences of the sensor head, on which surface the linking camera sees the same stripe patterns which can serve therefore as virtual pass marks. The linking camera need not therefore record the movement of the sensor head itself. A comparable self-calibration by virtual pass marks is described in a different context in the above-mentioned publication D 102 19 054 A1.

A corresponding development of the method proposed here which can be implemented with a device of the described type correspondingly provides that a total image of the surface is obtained from the determined contours of the individual parts of the surface by calibration of the various sensor head positions by means of the stationary linking camera which is likewise directed towards the surface. Triggering of the linking camera can thereby be synchronised with triggering of the cameras of the sensor head in that synchronisation signals are exchanged without wires between the sensor head and the linking camera.

Alternatively, a total image of the surface can also be obtained by so-called matching or image matching of partial images in that partial images in overlapping regions are evaluated for correspondence of a surface contour determined there. A stationary linking camera is then not absolutely necessary.

A particularly clear construction of the sensor head is produced if the two cameras of the sensor head have optical axes which are disposed mirror-symmetrically relative to a plane in which the optical axis of the projection lens is situated. In order to prevent shading of the surface as far as possible, the optical axes of the cameras and of the projection lens can in turn be situated in a common plane. In every case, it is an advantage with respect to a constant calibration of inner parameters of the sensor head if the projector and the cameras have fixed orientations relative to each other.

Manual operation of the device is possible in an uncomplicated manner if the cameras of the sensor head have an object-side focal intercept range which comprises at least one focal intercept from the interval of 30 cm to 50 cm. In the case of focal intercepts of this order of magnitude, sufficiently bright illumination of the surface can still be achieved with a projector which has a radiation power which is not too high for a battery or accumulator operation. Care should thereby be taken that the projector must also be provided with energy from the mentioned electrochemical energy store which can concern in particular a battery or an accumulator.

It can be provided that the cameras of the sensor head have variable lens systems in order to permit different focal intercepts and/or observation angles. In this case, the projector can also have a variable lens system.

Apart from the imaging element, the projector will typically have a light source, the imaging element then being designed for intensity modulation of light emanating from the light source. The imaging element can thereby be designed to be transmissive or reflective. In particular the imaging element can concern a microreflector array or an LCD, for example an LCOS. Preferably, a high-power LED is thereby used as light source which is distinguished by a low power requirement with a comparatively bright radiation, which is helpful with respect to the mains-independent design of the device.

In addition, in further developments of the invention, the sensor head can have a colour camera which is as high-resolution as possible for colour measurement of the surface. In the case of the corresponding method, in addition to an image sequence, also a colour recording can then be made with the colour camera likewise included by the sensor head in order to record 3D data respectively and can be used for colour measurement and/or recording of a texture of the surface. For illumination of the surface for this colour recording, the surface can be illuminated uniformly for a short period of time during the recording sequence. However, it is also possible that a uniform illumination is effected by a plurality of stripe patterns from the sequence during which the colour recording is effected.

The device described here can be equipped by programming technology to determine spatial coordinates by triangulation of object points which are identified with the help of the patterns projected thereon and observed with the two cameras of the sensor head. Known methods can be resorted to for this purpose. In particular use of colour-coded patterns or Gray code patterns is possible, possibly also reduced, i.e. ambiguous, Gray code patterns. A corresponding evaluation can possibly be undertaken in the control unit, for example when the latter is provided by a laptop. Evaluation of recorded data in the base unit which then acts as evaluation unit is more typical. The device can be equipped in particular by programming technology for generating at least one stripe pattern on the imaging element, for determining phase values in image points of the two cameras of the sensor head, for identifying mutually corresponding image points of the same phase values by comparing the phase values on mutually corresponding epipolar lines in image planes of the two cameras and for triangulating an object point on the basis of the thus identified image points corresponding to this object point.

This allows the use of epipolar geometry, which facilitates identification of mutually corresponding image points in the image planes of the two cameras of the sensor head and enables recording of the spatial coordinates of the surface with a significantly reduced number of patterns projected thereon and a corresponding reduced number of recordings in each sequence.

A corresponding method using epipolar geometry correspondingly provides that for identifying the mutually corresponding image points in the image planes of the two cameras for respectively one sensor head position phase values of the stripe patterns for image points in image planes of the two cameras are determined, pairs of respectively mutually corresponding epipolar lines in the image planes of the two cameras are selected and the phase values on the mutually corresponding epipolar lines in the image planes of the two cameras are compared.

An error-free identification of mutually corresponding image points in the image planes of the two cameras is possible in an even better manner if, for this purpose, furthermore the determined phase values along the epipolar lines are evaluated for constancy and the epipolar lines are hence divided into intervals of a constant phase course, after which mutually corresponding intervals in the mutually corresponding epipolar lines are identified and points of the same phase values within the mutually corresponding intervals are mutually assigned.

These method steps can also be achieved without difficulty by corresponding programming of the device.

BRIEF DESCRIPTION OF DRAWINGS

Embodiments of the present invention are described subsequently with reference to FIGS. 1 to 5.

There are shown

DETAILED DESCRIPTION

Figure 1:
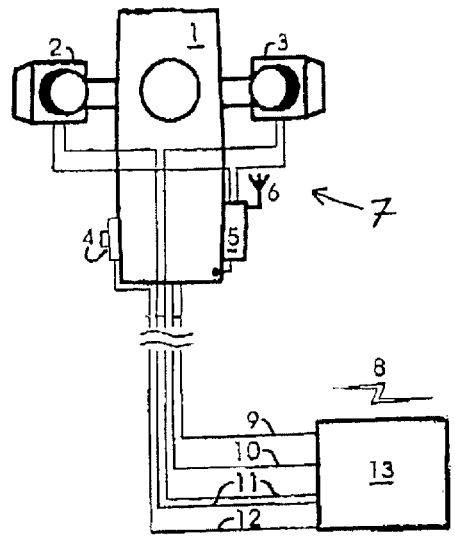
FIG. 1 a front view of a sensor head with a control unit, represented only schematically, in one embodiment of the invention, FIG. 2 a further development of the sensor head of FIG. 1 in a corresponding representation, FIG. 3 a schematic representation of a complete device in one embodiment of the invention, FIG. 4 a comparable representation of another embodiment of the invention and FIG. 5 a schematic representation of a further embodiment of the invention.

In FIG. 1, a sensor head 7 which has a projector 1 and two cameras 2 and 3 which are disposed symmetrically to this projector 1 can be detected. The projector 1 in turn comprises an imaging element which cannot be detected in FIG. 1 and a projection lens for projecting a variable pattern, which can be generated on the imaging element, towards a surface to be measured. The imaging element concerns an LCOS for intensity modulation of light which emanates from a light source of the projector 1 and which concerns a high-power LED. In other embodiments of the invention, instead of an LCOS, also a reflecting imaging element, for example a microreflector array (DMD), can be provided. Cameras 2 and 3 which are provided for observing the surface to be measured from two different directions are designed for an object-side focal intercept of approx. 40 cm. In other embodiments of the invention, both the cameras 2 and 3 and the projector 1 can be equipped with variable lens systems to enable variable object focal intercepts.

Also illustrated in FIG. 1 is a control unit 13 which is designed like the sensor head 7 designed as hand-held device as a portable device. The control unit 13 comprises means for actuating the imaging element of the projector 1, for triggering recordings synchronised with the patterns projected thereon by means of the two cameras 2 and 3 and for processing image data produced by the cameras 2 and 3. Likewise accommodated in the control unit 13 is an accumulator as electrochemical energy store which supplies both the control unit 13 and the sensor head 7.

Between the control unit 13 and the sensor head 7 there is provided a cable connection which comprises current supply lines 10, lines 9 for actuating the imaging element, a line connection 11 for transmitting camera signals from the cameras 2 and 3 to the control unit 13 and for transmitting control signals from the control unit 13 to the cameras 2 and 3 and also signal lines 12 for transmitting a trigger signal to the control unit. The control unit 13 is thereby connected via a DVI to the sensor head 7 and there to the projector 1 or to the imaging element. The cameras 2 and 3 of the sensor head 7 are connected by the line connection 11 via a FireWire interface to the control unit 13. Apart from the mentioned cable connection between the control unit 13 and the sensor head 7, no cable connection of the sensor head 7 or of the control unit 13 to other components of the device is provided, in particular no cable connection of the sensor head 7 or of the control unit 13 to further, stationary components of the device. A trigger 4 is disposed on the sensor head 7 and can trigger a recording sequence. An RF transmitter 5 is fitted likewise on the sensor head 7, having an antenna 6, the RF transmitter comprising a synchronisation unit for synchronising recordings of the two cameras 2 and 3. A further function of the RF transmitter 5 with the antenna 6 is explained further on.

Figure 2:
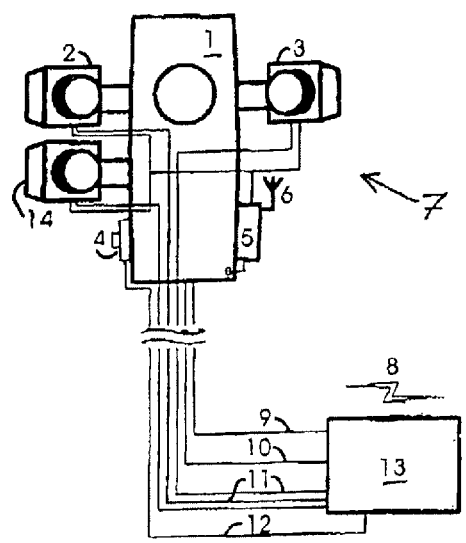

A sensor head 7 is shown in FIG. 2 in another embodiment of the invention, this sensor head 7 differing from the above-mentioned one merely due to an additional colour camera 14 for colour measurement of the surface to be recorded. Recurring features are provided here as also in the following Figures with the same reference numbers.

Figure 3:
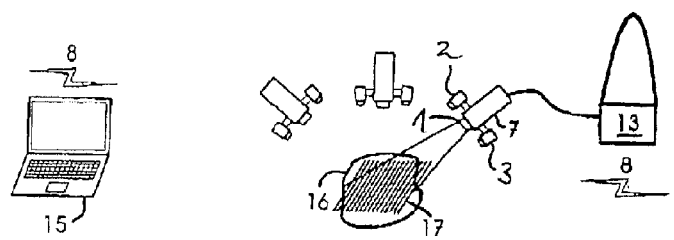

A complete device in a typical embodiment of the invention is shown in FIG. 3. The sensor head 7 from one of the two previous Figures is illustrated there in three different positions for an all-round measurement of an object 16. The control unit 13 connected to the sensor head is likewise illustrated. In addition, a base unit 15 which is separated spatially from the control unit 13 and the sensor head 7 is detectable, means for wireless data exchange between the base unit 15 and the control unit 13 being provided. A connection which is provided for this data exchange and which can concern for example a WLAN connection is illustrated here by a radio symbol 8. The means for wireless data exchange comprise in particular a channel for transporting data obtained from camera images of the two cameras 2 and 3. These data are obtained by pre-processing and/or partial evaluation of image data of the two cameras 2 and 3 in the control unit 13.

By means of corresponding programming of the control unit 13 and of the base unit 15, the illustrated device is equipped by programming technology for triangulation of object points on the object 16 by means of the two cameras 2 and 3 of the sensor head 7 after identification of these object points with the help of stripe patterns 17 projected thereon.

In the case of a method, implemented with the device of FIG. 3, for non-contact recording of spatial coordinates of a surface of the object 16, a sequence of different stripe patterns 17 is projected onto the surface for each sensor head position, the surface illuminated with the stripe patterns 17 being recorded respectively with the two cameras 2 and 3 of the hand-guided sensor head 7. With the help of the stripe patterns 17 projected thereon, image points which mutually correspond at this sensor head position are then identified in image planes of the two cameras 2 and 3, whereupon, for a quantity of object points which are situated closely together in one part of the surface which can be recorded at the respective sensor head position, depth information is determined on the basis of the thus identified image points, corresponding to the respective object points, in the image planes of the two cameras 2 and 3.

In order to trigger an image sequence at a specific position of the sensor head 7, a trigger command is thereby transmitted to the control unit 13 by pressing the trigger 4 of the sensor head 7. The control unit 13 thereupon actuates the imaging element of the projector 1 in order to form a sequence of stripe patterns 17, the control unit 13 emitting at the same time control signals to the cameras 2 and 3 in order to trigger a recording sequence respectively synchronised with the stripe patterns 17. Image data thereby obtained are then transmitted from the cameras 2 and 3 to the control device 13 where the image data are pre-processed in order to form data which reproduce phase images of the corresponding part of the surface of the object 16. These data which reproduce the phase images are transmitted then by the control unit 13 by means of the mentioned means for the wireless data exchange without wires to the base station 15 which implements further calculation steps in order to identify mutually corresponding image points and in order too triangulate the object points. During a recording sequence which lasts not quite 150 ms, 8 to 10 different stripe patterns 17 are projected onto the object 16, one recording respectively being made with each of the cameras 2 and 3 of the corresponding part of the surface of the object 16 with each of these stripe patterns 17.

As is indicated in FIG. 3 by the different positions of the sensor head 7, different parts of the surface of the object 16 which mutually overlap in places are recorded from different sensor head positions. Thus an all-round measurement of the object 16 is possible, partial images which are obtained at the individual sensor head positions, being able to be supplemented, for example by matching, to form a complete surface image of the object 16.

Contrary to the sensor head 7 which is designed to be mobile and mains-independent and the likewise portable and mains-independent control unit 13, the base unit 15, in the embodiment reproduced in FIG. 3, is provided by a PC.

Figure 4:
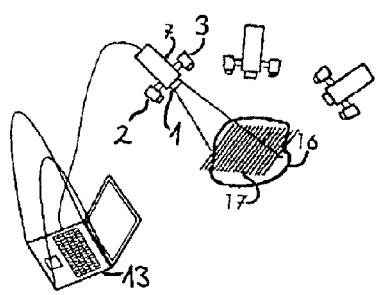

Another embodiment of the invention is illustrated in FIG. 4. The control unit 13 is provided here by a laptop which assumes the functions both of the control unit 13 and of the base unit 15 from the embodiment of FIG. 3. A wireless data exchange is therefore not required with this embodiment of the invention because complete processing of determined data can be effected here in the mobile control unit 13. A wireless data transmission emanating from the sensor head 7 or the control unit 13 is not necessary here. In any case, the laptop acting here also as control unit 13 is mobile and mains-independent. The method which is implemented can be modified when using the sensor head of FIG. 2 in that, in addition to a recording sequence by the cameras 2 and 3 respectively, a colour recording with the colour camera 14 is made and used for colour measurement of the surface. This applies not only to the device of FIG. 4 but also to the other devices described here.

Figure 5:
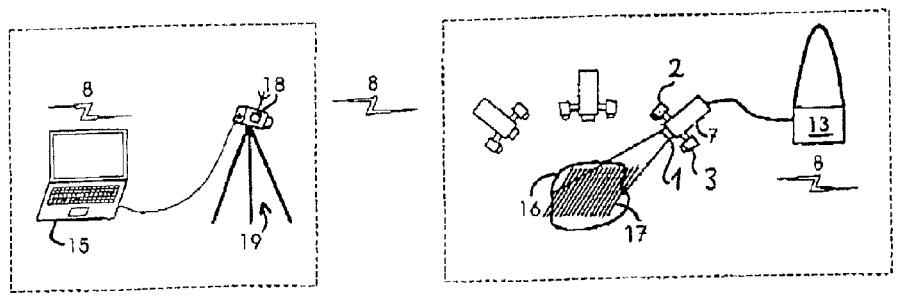

A further embodiment of the invention is shown finally in FIG. 5. Relative to the embodiment of FIG. 3, the device shown here has in addition a stationary linking camera 19 connected to the base unit 15, the means for wireless data exchange here also being able to comprise a channel for transport of control signals for synchronisation of triggering of the two cameras 2 and 3 of the sensor head, on the one hand, and of the linking camera 19, on the other hand. This channel is produced by the RF transmitter 5, mentioned in conjunction with FIG. 1, with the antenna 6 and by a corresponding receiver 18 which is disposed on the linking camera.

FIG. 5 thereby shows schematically a possible multiview use scenario of the sensor head 7 and of the control unit 13. By means of the linking camera 19, which is synchronised by radio with the sensor head 7, a plurality of views of the object 16 are thereby combined to form an all-round measurement with methods of self-calibration, more precisely by virtual pass marks.

In a corresponding method, again different parts of the surface of the object 16 which mutually overlap only in places are recorded from different sensor head positions. From determined contours of the individual parts of the surface, a total image of the surface is thereby obtained by calibration of the various sensor head positions by means of the stationary linking camera 19 which is likewise directed towards the surface of the object 16.

In order to enable a shake-free manual operation of the sensor head 7, the time required for a recording sequence should be kept as short as possible. This restricts the number of stripe patterns 17 included by a sequence. In order to manage with a lower number of stripe patterns 17 and a correspondingly low number of recordings, use can be made profitably of epipolar geometry. A corresponding embodiment of the method which can be achieved by equipping the device with programming technology provides for this purpose that for identifying the mutually corresponding image points in the image planes of both cameras 2 and 3 for respectively one position of the sensor head phase values of the stripe patterns 17 for image points in image planes of the two cameras 2 and 3 are determined,
pairs of respectively mutually corresponding epipolar lines in the image planes of the two cameras 2 and 3 are selected,
the phase values on the mutually corresponding epipolar lines in the image planes of the two cameras are compared.

Possibly, then a small number of stripe patterns 17 which are projected thereon and differ from each other for example only by a phase shift suffices. A further development of this method provides that for identifying the mutually corresponding image points, furthermore the determined phase values along the epipolar lines are evaluated for constancy and
the epipolar lines are divided hence into intervals of a constant phase course,
after which mutually corresponding intervals in the mutually corresponding epipolar lines are identified and
points of the same phase values are mutually assigned within the mutually corresponding intervals.

The problem of searching for mutually corresponding image points in the image planes of both cameras is consequently reduced for each pair of epipolar lines to a one-dimensional problem, identification being possible without difficulty as a result of the just-mentioned measures, even with discontinuities which are caused by vertical jumps. The pairs of epipolar lines which are a prerequisite, as known, of this method are thereby produced unequivocally from the inner geometry of the sensor head 7.

The embodiment of FIG. 5 can be extended finally in that not only a stationary linking camera 19 but also a plurality of linking cameras 19 of this type are used.

An advantageous rapid projection of pattern sequences and a correspondingly rapid image recording can, as described here, be achieved not only by using epipolar geometry but also by means of other suitable projection patterns for obtaining phase values, for example by reduced Gray codes, colour codes, simple sine patterns and evaluation by means of spatial phase shift methods and also Moiré methods. Resorting to photogrammetric methods, for example using ring patterns or point patterns, instead of the stripe patterns discussed till now is likewise possible.

By using variable lens systems, not only an adjustable object focal intercept but also a variable measuring field extension can be achieved.

An all-round measurement (multiview measurement) can be produced by various concepts, for example by image matching, use of virtual or real pass marks or other forms of self-calibration.

Use of the device described here is possible independently of external electrical mains supplies. That opens up new possibilities for use, for example in three-dimensional crime scene recording in criminology or in three-dimensional recording of archaeological sites. 3D scanners known to date are not suitable for this purpose because they require a current connection there in order to use pattern projectors. In the case of conventional applications of stripe projections for recording spatial surface coordinates, sensor fixings or object fixings, for example by stands, are always used, a connection to a mains supply being required at the same time. Conventional wireless cameras in contrast are not suitable for a comparable manual surface measurement because they do not achieve image data transmission in the required resolution at image rates of the order of magnitude of 60 Hz because of band width limitations.

In contrast, with the device presented here, a surface measurement is achieved with a hand-guided sensor 7 which requires no cable connection to stationary components and with which in particular multiview measurements are possible without markers or tracking.

With the device described here, a 3D sensor has been developed on the basis of a miniaturised digital accumulator-operated projector 1 and a plurality of digital cameras (2, 3 and optionally 14) which make possible the construction of a compact sensor head 7. With this system, an object 16 can be measured flexibly with the help of a sequence of a plurality of stripe patterns 17. The control and the current supply of the sensor head are thereby effected via a cable strand (DVI 9, current 10, FireWire 11 and sequence resolution 12) by means of a control unit 13. This unit (for example an embedded system or a notebook in addition to accumulator) is carried by the operator close to his body (for example in a rucksack) or can also be accommodated in the handle of the sensor head. In particular if the control unit is carried on the body independently of the sensor head 7, the weight of the sensor head can be kept low, which enables non-tiring operation and easy handling. A stripe sequence is triggered without shake by a trigger 4 with a delay. In order to be able to determine the phase values underlying the 3D coordinate calculation by means of the stripe projection when using a hand-guided sensor, the projection and image recording of all required images of one sequence must be concluded in less than 150 ms. This can be achieved, on the one hand, by synchronisation of all the cameras with the digital projector used for the projection (transmission via RF transmitter 5 and RF antenna 6, reception via receiver 18 serving as synchronisation unit). On the other hand, the image-, projection- and recording rate is at least 60 Hz. Hence, at least nine patterns are available for the pattern projection. This low number of patterns suffices however using the pre-calibrated sensor head 7 for achieving a 3D view of the measured object. The data and synchronisation transmission to a base unit 15, which optionally can control further object-fixed linking cameras 19 and implements continuous calculation and evaluation steps, is effected by radio, illustrated by the symbol with the reference number 8.

Different coding and evaluation methods can be used as the basis of the 3D measurement (for example using epipolar geometry, colour-coded patterns, reduced Gray code patterns).

A compact, flexibly usable optical 3D sensor can be produced with the present invention. Hand-guided 3D scanning is made possible by the light sensor head in conjunction with a short stripe sequence which is projected and recorded at a frequency of at least 60 Hz. Current supply and control of the sensor head 7 is made possible by a portable control unit 13 which transmits data- and synchronisation signals without wires to a base station. Hence very short constructional and measuring times can be achieved, which allows for example on site or out-of-doors measurements because of the high-grade mobile character of the system. Fully self-sufficient 3D measuring systems of this type have not been known previously.

On the basis of this concept of a portable, mains-independent, hand-guided 3D sensor for 3D measurement, different system productions can be developed. FIG. 1 shows the construction in principle of the mobile sensor unit (sensor head 7), FIG. 2 shows a variant with use of an additional higher-resolution colour camera 14. In FIG. 3, a system configuration comprising the mobile 3D sensor (no connection to a mains supply) and a mobile or stationary PC/laptop base station connected via radio. An alternative use concept in which the base station is also designed identically to be mobile as a notebook and with the control unit 13, the latter being able to be carried on the body of the operator by means of a holding device, is shown in FIG. 4. The radio connection can be dispensed with here and the base station (laptop) can be connected directly to the 3D sensor head. A connection to a mains supply is also not required here. FIG. 5 shows a possible embodiment with mobile 3D sensor with wireless communication between 3D sensor head and base station and additional linking camera 19 for all-round measurement with self-calibration.

In the case of an optical sensor for 3D measurement based on stripe projection, comprising a sensor head, constructed from a digital projector 1 and a plurality of digital cameras (2, 3 and optionally 14) and a mobile control unit 13, a hand-guided, cable-free 3D measurement is made possible therefore according to the invention in that a short stripe sequence timed by a special synchronisation device (5, 6 and 18) is recorded by all cameras in the image cycle of the projector. By using an embedded system (control unit 13) which is separate from the sensor head 7, the weight can be reduced and nevertheless current supply and camera control on the body can be achieved. This makes it possible to dispense with any cables from the sensor head to the evaluation computer of the base station 25. The pre-processing of the measuring data before the radio transmission contributes thereto.

The device proposed here, in its various embodiments, is provided respectively so that, by means of a corresponding actuation of the imaging element, a two-dimensional pattern, preferably a stripe pattern, is projected by the projector onto the surface to be measured. The spatial coordinates of the surface can then be recorded by means of the at least one camera by triangulation, the pattern projected thereon or plurality of patterns projected thereon serving for identification of points on the surface. The at least one camera need not thereby itself be designed as a distance-measuring device—in particular a spacing or distance determination by direct or indirect running time measurements is not required and typically is not provided.

If the devices comprise two cameras, one point on the surface can be triangulated advantageously in that mutually corresponding image points in the image planes of the two cameras are identified and a spacing between the two cameras is used as triangulation basis.

A change in actual position of the sensor head designed as hand-held device can be recorded and taken into account by means of an evaluation algorithm by evaluating image data which likewise change with such a change in position. Alternatively or additionally, a further camera, stationary relative to the surface to be measured, can be provided for this purpose, said camera being able to be directed likewise towards this surface and being able to deduce the position of the sensor head from the pattern projected thereon.

The invention claimed is:

1. A device for non-contact recording of spatial coordinates of a surface, comprising:
    a sensor head designed as a portable hand-held device, the sensor head including a projector with an imaging element, a projection lens and at least one camera, the projection lens projecting a variable pattern, which is generated on the imaging element, towards a surface, the at last one camera observing the surface;
    a control unit connected to the sensor head, the control unit designed as a portable device, the control unit including an arrangement actuating the imaging element, triggering recording by the at least one camera and processing image data produced by the at least one camera;
    a cable connection connecting the sensor head and the control unit, the cable connection including a current supply line, a line actuating the imaging element, a line connection transmitting camera signals from the at least one camera to the control unit and transmitting control signals from the control unit to the at least one camera and signal lines transmitting a trigger signal to the control unit;
    an electrochemical energy arrangement storing an energy supply of the sensor head and the control unit, the arrangement being situated in the control unit;
    a base unit separated spatially from the control unit and the sensor head;
    a wireless arrangement allowing a wireless data exchange between the base unit and one of the control unit and the sensor head; and
    a stationary linking camera connected to the base unit, wherein the wireless arrangement includes a channel transporting control signals in order to synchronize triggering of the at least one camera and the linking camera, the linking camera being configured to record the surface with the projected pattern synchronously with the recording of the sensor head, wherein the base unit is configured to calibrate the sensor head for each one of variable positions of the sensor head by using virtual patterns recorded by the stationary linking camera as virtual pass marks,
    wherein the cable connection is the only external cable connection of the sensor head and of the control unit.

2. The device according to claim 1, wherein the sensor head includes two cameras observing the surface from two different directions.

3. The device according to claim 1, wherein the control unit is connected to the imaging element via one of a DVI connection and a VGA connection.

4. The device according to claim 1, wherein the at least one camera is connected to the control unit via one of a FireWire interface and a USB interface.

5. The device according to claim 1, wherein the wireless arrangement includes a channel for transport of data obtained from camera images of the at least one camera.

6. The device according to claim 5, wherein the data is obtained from image data of the at least one camera by at least one of pre-processing and partial evaluation in the control unit.

7. The device according to claim 1, wherein the wireless arrangement includes a WLAN connection.

8. The device according to claim 1, wherein the sensor head has two cameras with optical axes which are disposed mirror-symmetrically relative to a plane in which the optical axis of the projection lens is situated.

9. The device according to claim 1, wherein the at least one camera has an object-side focal intercept range which comprises at least one focal intercept from the interval of 30 cm to 50 cm.

10. The device according to claim 1, wherein the at least one camera has a variable lens system.

11. The device according to claim 1, wherein the projector includes a light source, the imaging element being designed to be one of transmissive and reflective for intensity modulation of the light emanating from the light source.

12. The device according to claim 11, wherein the light source is a high-power LED.

13. The device according to claim 1, wherein the sensor head has a color camera which color recording of the surface.

14. The device according to claim 1, further comprising: a memory arrangement storing a programming technology which triangulating object points which are identified using patterns projected thereon and observed with the at least one camera.

15. The device according to claim 14, wherein the sensor head includes two cameras observing the surface from two different directions and wherein the programming technology (a) generates at least one stripe pattern on the imaging element, (b) determines phase values in image points of the two cameras of the sensor head, (c) identifies mutually corresponding image points of the same phase values by comparing the phase values on mutually corresponding epipolar lines in image planes of the two cameras and (d) triangulates an object point using the identified image points corresponding to the object point.

16. The device according to claim 14, wherein the programming technology (a) generates at least one stripe pattern on the imaging element, (b) determines phase values in image points of the at least one camera, (c) identifies mutually corresponding points in one image plane of the at least one camera and on the imaging element by comparing the phase values on mutually corresponding epipolar lines in the image plane of the at least one of camera and on the imaging element and (d) triangulates an object point using the identified points corresponding to the object point.

17. A method for non-contact recording of spatial coordinates of a surface using a device, the device including at least following: (a) a hand-guided sensor head, (b) a control unit connected to the sensor head, (c) a cable connection connecting the sensor head and the control unit, (d) an electrochemical energy arrangement storing an energy supply of the sensor head and the control unit, (e) a base unit, (f) a wireless arrangement, and (g) at least one stationary linking camera, the method comprising:

projecting various stripe patterns onto the surface and recording the surface illuminated with the stripe patterns using a projector with an imaging element and at least one camera of the sensor head;

using at least one of the control unit and the base unit, identifying one of (a) mutually corresponding image points in image planes of two cameras of the at least one camera and (b) mutually corresponding points in an image plane of the at least one camera and on the imaging element using the stripe patterns projected onto the surface; and using at least one of the control unit and die base unit, determining depth information for object points by triangulation as a function of one of the identified image points and points corresponding to the respective object points, wherein the base unit is separated spatially from the control unit and the sensor head, wherein the wireless arrangement allows a wireless data exchange between the base unit and one of the control unit and the sensor head, wherein the stationary linking camera is connected to the base unit, wherein the wireless arrangement includes a channel transporting control signals in order to synchronize triggering of the at least one camera and the linking camera, the linking camera being configured to record the surface with the projected pattern synchronously with the recording of the sensor head, and wherein the base unit is configured to calibrate the sensor head for each one of variable positions of the sensor head by using virtual patterns recorded by the stationary linking camera as virtual pass marks.

18. The method according to claim 17, further comprising:
transmitting a trigger command from the sensor head to a control unit of the device to record an image sequence;
actuating the imaging element by the control unit to form a sequence of stripe patterns;
providing control signals to the at least one camera to trigger respectively one recording sequence;
transmitting obtained image data from the at least one camera to the control device, the image data being pre-processed to form data reproducing phase images; and
transmitting data reproducing the phase images by the control unit without wires to a base station which implements further calculation steps for identifying mutually corresponding image points and triangulating the object points.

19. The method according to claim 18, wherein the recording sequence at least one of (a) lasts at most 150 ms and (b) comprises eight to ten recordings by one of the at least one camera and each of the two cameras.

20. The method according to claim 17, wherein various parts of the surface, which mutually overlap in places, are recorded from various positions of the head sensor.

21. The method according to claim 17, wherein a color recording is made with a color camera of the sensor head for each of the positions of the sensor head, the color camera being utilized for color measurement of the surface.

22. The method according to claim 17, wherein the step of identifying the mutually corresponding image points in the image planes of two cameras of the sensor head for respectively one sensor head position includes the following sub-steps:
determining phase values of the stripe patterns for image points in image planes of the two cameras;
selecting pairs of respectively mutually corresponding epipolar lines in the image planes of the two cameras; and
comparing the phase values on the mutually corresponding epipolar lines in the image planes of the two cameras.

23. The method according to claim 17, wherein the step of identifying the mutually corresponding points in the image plane of the camera and on the imaging element for respectively one sensor head position includes the following sub-steps:

determining phase values of the stripe patterns for image points in an image plane of the at least one camera;

selecting pairs of respectively mutually corresponding epipolar lines in the image plane of the at least one camera and on the imaging element; and comparing the phase values on the mutually corresponding epipolar lines in the image planes of the at least one camera and on the imaging element.

24. The method according to claim 22, further comprising:

evaluating the determined phase values along the epipolar lines for constancy;

dividing the epipolar lines into intervals of a constant phase course;

after the dividing step, identifying mutually corresponding intervals on the mutually corresponding epipolar lines; and mutually assigning points of the same phase values within the mutually corresponding intervals.

* * * * *